June 11, 1940.  S. H. STONE  2,203,884
HOLDING OR STRIPPING MECHANISM FOR SHEARING MACHINES
Filed Nov. 20, 1939  2 Sheets-Sheet 1
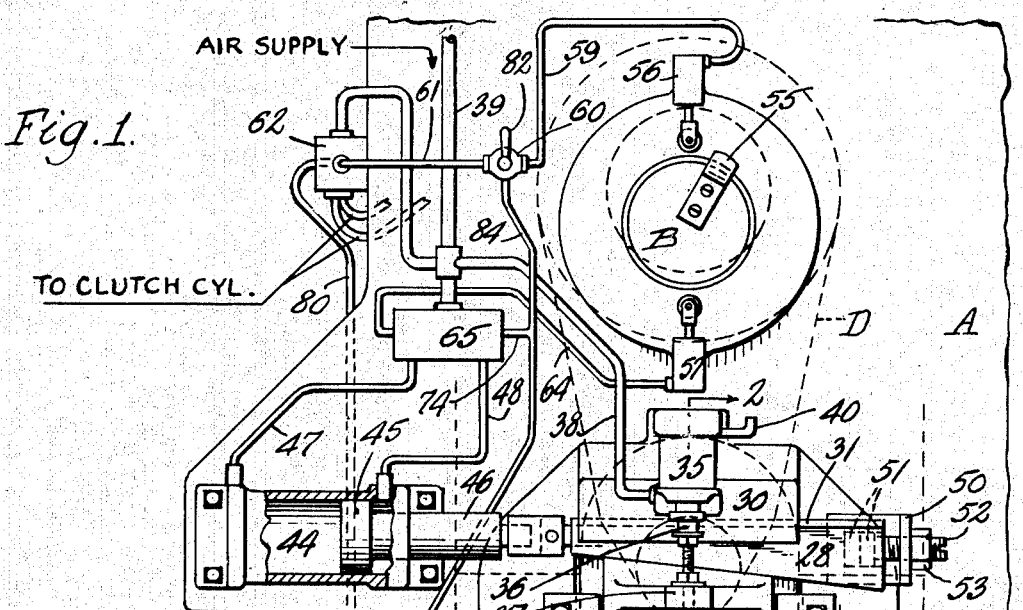
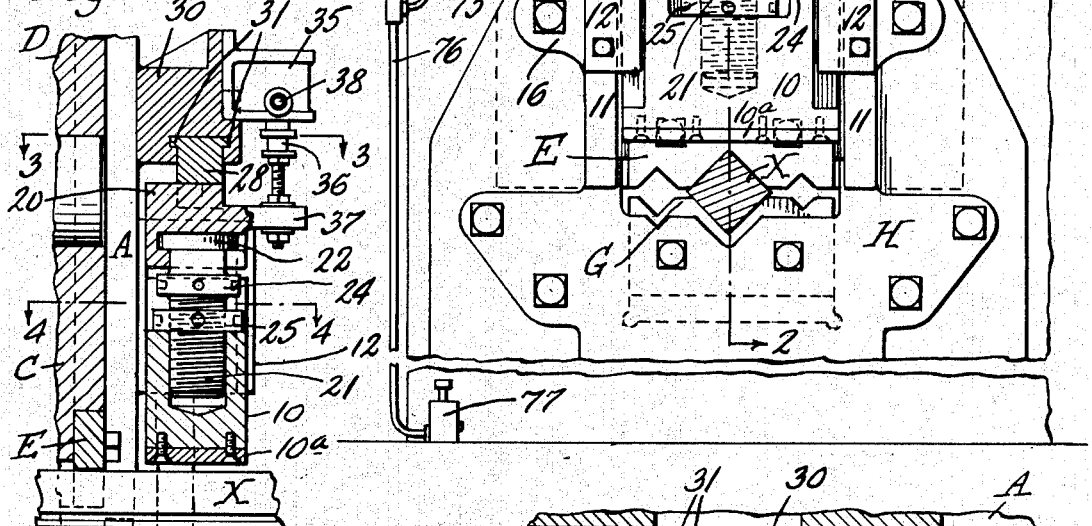
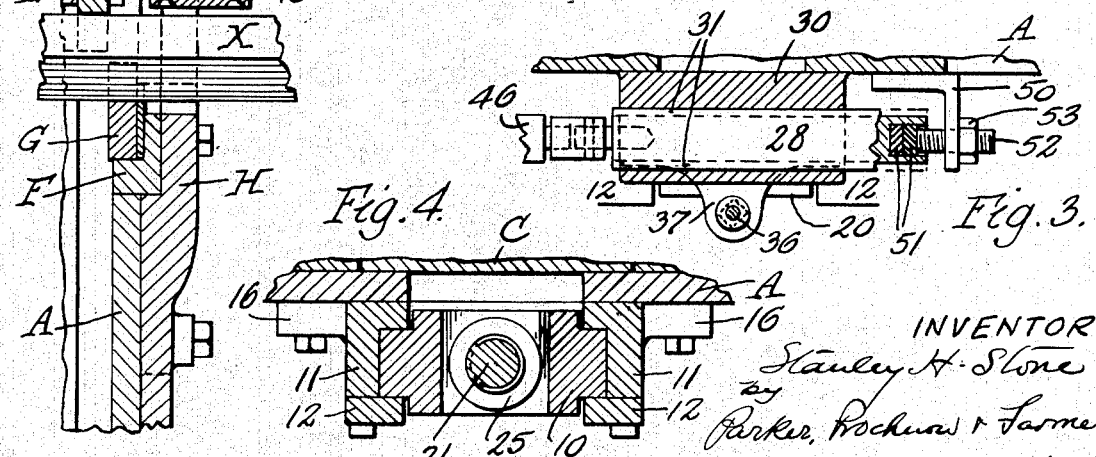
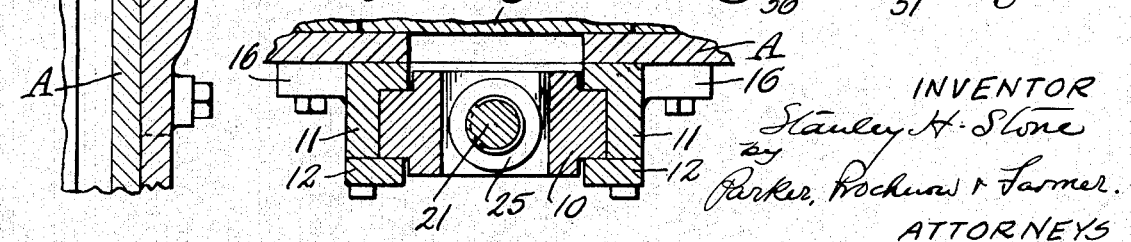
INVENTOR
Stanley H. Stone
by
Parker, Rockwood & Farmer
ATTORNEYS June 11, 1940.  S. H. STONE  2,203,884
HOLDING OR STRIPPING MECHANISM FOR SHEARING MACHINES
Filed Nov. 20, 1939  2 Sheets-Sheet 2
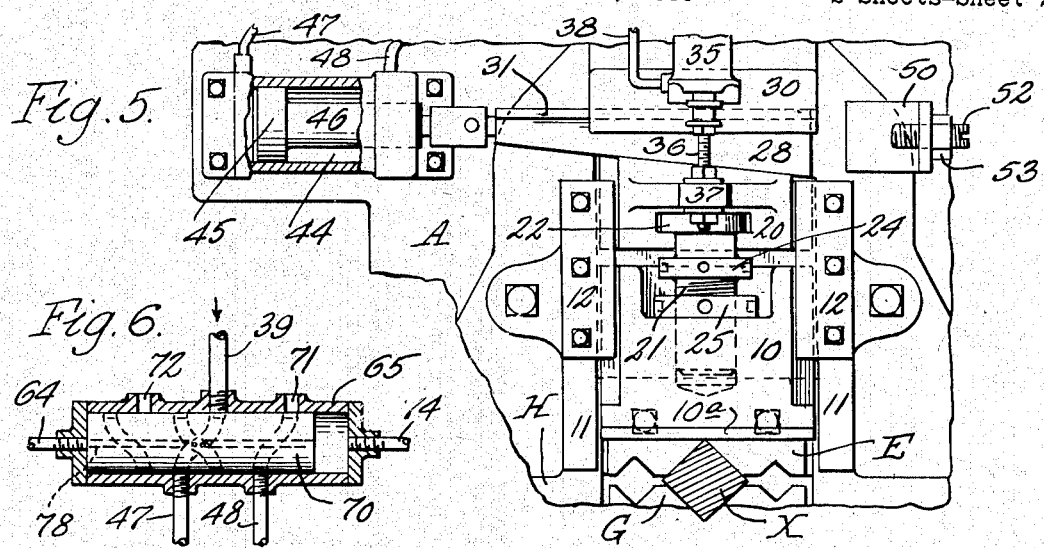
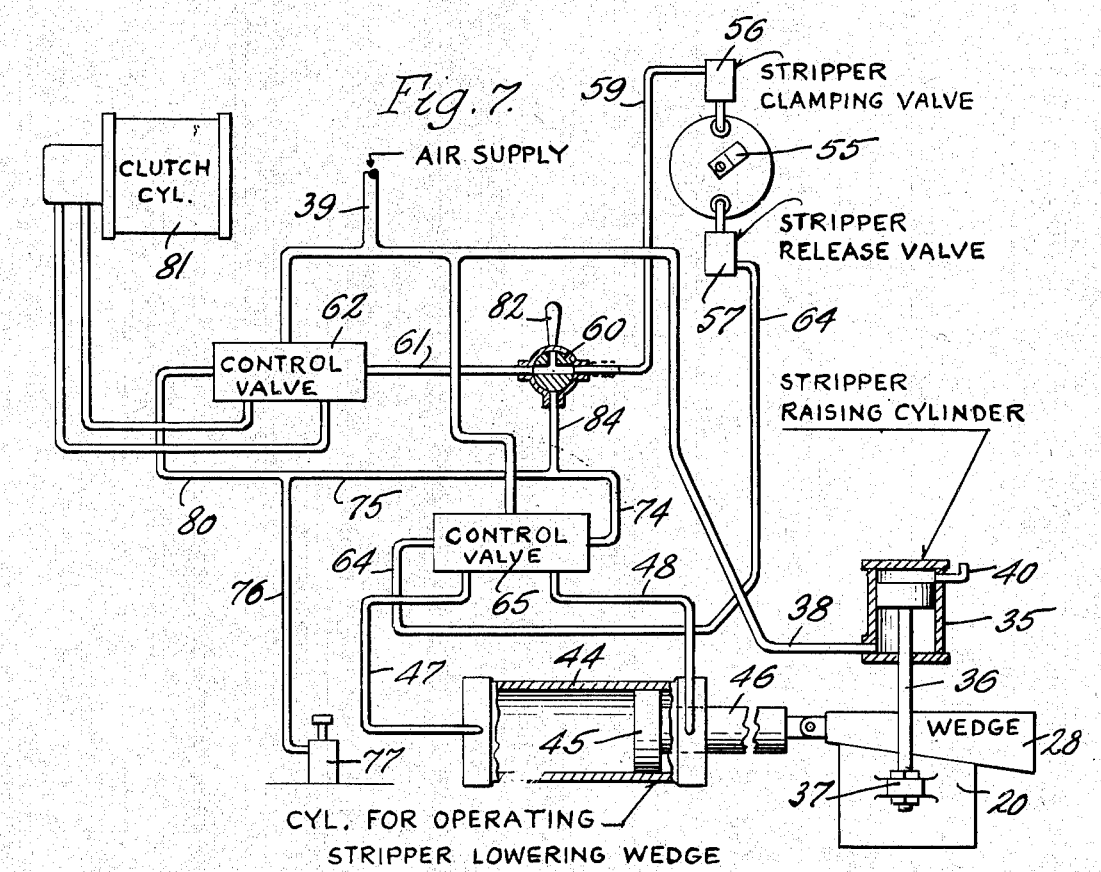
INVENTOR
Stanley H. Stone
By Parker, Rockwood & Farmer
ATTORNEYS Patented June 11, 1940

2,203,884

UNITED STATES PATENT OFFICE 2,203,884

HOLDING OR STRIPPING MECHANISM FOR SHEARING MACHINES

Stanley H. Stone, Buffalo, N. Y., assignor to Buffalo Forge Company, Buffalo, N. Y.

Application November 20, 1939, Serial No. 305,219

12 Claims. (Cl. 164—52)

This invention relates to improvements in hold-down or stripping mechanisms for shearing machines and the like.

One of the objects of this invention is to provide a mechanism of this kind of improved construction for moving the stripping member into engagement with the work. Another object is to provide a mechanism of this kind provided with positively acting means for moving the stripper into engagement with the work, and continuously acting resilient means for moving the stripper out of engagement with the work. A further object is to provide improved mechanism of this kind of simplified construction for adjusting the stripper so as to cooperate with work of different dimensions. Other objects will appear from the following description and claims.

In the accompanying drawings:

Fig. 1 is a fragmentary front elevation of a shearing machine having applied thereto a work holding or stripping mechanism embodying this invention.

Fig. 2 is a fragmentary longitudinal central sectional elevation thereof, on line 2—2, Fig. 1.

Figs. 3 and 4 are respectively fragmentary sectional plan views thereof, taken on lines 3—3 and 4—4 respectively, Fig. 2.

Fig. 5 is a fragmentary front elevation thereof similar to Fig. 1, but showing the parts of the mechanism in different positions.

Fig. 6 is a sectional view of a control valve which may be used in connection with my improved mechanism.

Fig. 7 is a diagrammatic view of the fluid pressure operated means for operating my improved holding or stripping mechanism.

While I have shown my improved holding or stripping mechanism applied to a shearing or cutting machine of the type commonly referred to as a "billet shear," it will be understood that the shearing machine used is shown merely for the purpose of illustrating one application of my improved stripping mechanism, and it will be understood that the same may be used in connection with shearing or cutting machines of other kinds.

In the particular shearing machine illustrated, the frame of the machine includes a pair of parallel plates spaced apart on which the various parts of the machine are mounted, only one of these plates, namely, the front plate A being shown in the accompanying drawings. The machine includes the usual eccentric shaft B having an eccentric secured thereon and arranged between the two plates of the frame. The eccentric actuates a vertically movable plunger C, Fig. 2, through the medium of an eccentric strap or ram D, also shown in broken lines in Fig. 1, the ram and plunger being arranged between the two plates of the frame. E represents the upper or movable knife which is mounted on the lower end of the plunger C. F represents the usual lower knife seat to which the lower knife G is secured, see Fig. 2, the knife seat being secured to the front frame plate A and being supported partly by this frame plate and partly by a knife supporting bracket or auxiliary frame H, as clearly shown in Fig. 2. This bracket or auxiliary frame H is bolted or otherwise secured to the front frame plate and thus forms a part of and reinforces the frame of the machine. X represents the work which is to be cut, such for example as a bar or billet.

In accordance with this invention, I provide a holding or stripping member or block 10 which is slidably mounted in an upper extension or portion of the lower knife holder or auxiliary frame H. This part of the bracket or frame member H is provided with a pair of upright guide rails or bars 11 arranged to engage the opposite sides of the stripper member 10. 12 represents a pair of guide strips or plates which may be bolted or otherwise secured to the front edges of the guide members 11 and engaging with the front face of the stripper member 10 at the edge portions thereof. By means of this construction, it will be evident that the stripper may reciprocate between the two guide portions 11 engaging the sides thereof and between the guide plates 12 and frame H engaging respectively the front and rear faces thereof, 10a represents a hardened wear plate removably secured to the lower face of the stripper member 10 in position to engage the work. Other means for mounting the stripper member for reciprocatory movement on the machine may be employed, if desired. It will be noted that the lower portion of the auxiliary frame in part supports the lower knife, so that the auxiliary frame carries the load resulting from the pressure of the stripper against the lower knife.

The stripper may be formed of a single piece, or, if desired, it may comprise two parts adjustably secured together to adapt the machine to operate on work of different dimensions. In the particular construction shown, the lower stripper member or part 10 is adjustably secured to an upper member or part in the form of a reciprocatory block 20, which is also arranged to move vertically in the same guides provided for the stripper 10. Any suitable or desired means may be employed for providing an adjustable connection between these two parts of the stripper, and in the construction shown by way of example, a screw 21 is employed for this purpose which has a threaded portion engaging in a correspondingly threaded hole extending downwardly into the stripper member 10. This adjusting screw also has a head or part 22 which is arranged in a slot in the reciprocatory block 20 in such a manner that the screw may be turned relatively to this block but is held against endwise movement relatively to the block. The screw may be provided in the space between the block 20 and the lower stripper member 10 with an annular outwardly extending portion or flange 24 by means of which the screw 20 can be turned. This outwardly extending part 24, in the construction shown, is provided with holes spaced in the periphery thereof with which a wrench or other tool may engage for turning the screw 20. 25 represents a lock nut arranged on the screw 20 for the purpose of locking the screw in adjusted position. It will be understood that since the movement imparted to the stripper toward and from the work is limited, this adjustment is desirable for enabling the stripper to engage the work, regardless of the transverse dimension or thickness of the work which is being operated upon by the machine.

The movement of the reciprocatory block or upper part 20 of the stripper and the lower stripper member 10 toward and from the work is, in accordance with this invention, accomplished by means of a wedge 28 movable between the upper stripper member 20 and a fixed part of the machine. In the particular construction shown for this purpose, the wedge 28 is provided with an inclined lower face engaging a correspondingly inclined upper face of the reciprocatory block 20. The upper part of the wedge 28 is slidably mounted on a stationary wedge guide member, which, in the construction shown, is formed by an enlarged upper portion 30 of the bracket or frame member H which also in part supports the knife seat F and the work X. In the particular construction shown, the upper part of the wedge 28 is provided with a pair of outwardly extending flanges 31 at opposite sides thereof, see particularly Fig. 2, and this part of the wedge fits into a correspondingly shaped groove formed in the wedge guide member 30. When the wedge 28 is in the position shown in Fig. 1, the stripper is raised out of engagement with the work X, and when the wedge is moved to the left into the position shown in Fig. 5, the stripper will be in engagement with the work for holding the same while the movable knife E makes the cut.

Any suitable or desired means may be provided for moving the stripper into its upper position in which the block 20 bears against the inclined face of the wedge. In the particular construction illustrated, I have provided resilient means for urging the stripper into its upper position. Any suitable means may be employed for this purpose, and in the construction shown by way of example, I provide a cylinder 35, which is mounted on the guide member 30 and which has a piston connected with a piston rod 36, the outer end of which is secured to a forwardly extending projection 37 formed on the block 20 of the stripper. Fluid under pressure, such for example as air, is conducted to the lower part of the cylinder 35 by means of a pipe 38 connected with a supply pipe 39 for fluid under pressure. Consequently, the pressure of the fluid will continually and yieldingly urge the piston in the cylinder 35 upwardly, and thus urge the reciprocatory block 20 into engagement with the wedge 28. The upper part of the cylinder 35 above the piston is preferably open to the air, for example, by means of a vent pipe 40. By means of this arrangement, the stripper 10 will be yieldingly held in its upper or inoperative position. If, however, the wedge 28 is moved to the left in Fig. 1, the stripper will be moved downwardly against the air pressure acting in the cylinder 35. Any other means for maintaining the block 20 of the stripper in engagement with the wedge 28 may be employed, if desired.

The wedge 28 may be moved into and out of its operative position in any suitable or desired manner. In the particular construction illustrated, I have provided means for moving the wedge 28 by means of a fluid pressure controlled mechanism, including a cylinder 44 having a piston 45 provided with a piston rod 46 which is suitably connected with the wedge 28. A supply pipe or duct 47 carries fluid under pressure to the head of the cylinder 44 for moving the piston and wedge to the right into the position shown in Fig. 1, and another fluid supply pipe 48 conducts fluid under pressure to the opposite end of the cylinder 44 for moving the piston 45 and the wedge 28 to the left into their operative positions shown in Fig. 5. It will be noted that the piston rod 46 is of relatively large diameter so that fluid pressure entering the cylinder through the pipe 48 for moving the wedge 28 into its operative position, will act upon a relatively small portion of the actual area of the piston. In order to move the wedge back into its inoperative position, fluid admitted to the head of the cylinder 44 acts upon the full area of the piston, so that in the event that the wedge 28 becomes jammed into its operative position, due possibly to a shifting of the work X while being cut, there will be ample power available to move the wedge 28 to the right to release the work.

I preferably also provide means for yieldingly stopping the movement of the wedge 28, in order to prevent the movement of the piston 45 to the right in Figs. 1, 3 and 5 from damaging the piston 45 or its cylinder 44. In the particular construction shown for this purpose, I provide an outwardly extending arm or bracket 50 which may be suitably supported on a rigid part of the machine, and which extends into operative relation to the end of the wedge 28. I preferably provide yielding means for stopping the movement of the wedge 28. In the particular construction shown for this purpose, I have provided in the right hand end of the wedge in Figs. 1, 3 and 5 an aperture or hole containing one or more rubber disks or pads 51, and a stud 52 is arranged to engage these pads to stop the movement of the wedge. The stud 52 in the construction shown is secured to the outwardly extending arm 50, preferably by means of a threaded engagement with an aperture in the projection 50, so that the stud 52 may be adjusted as may be desired, and a lock nut 53 may be provided to hold the stud in the desired position. Consequently, when the wedge is moved to the right in Figs. 1, 3 and 5, it is yieldingly brought to a stop by the engagement of the stud 52 with the resilient pads 51 arranged in the end of the wedge. Any other means for yieldingly stopping the movement of the wedge into its inoperative position may, of course, be employed, if desired.

Means are preferably also provided for moving the stripper or holding member 10 automatically into and out of its operative position in timed relation to the movement of the movable knife. Any suitable or desired means may be employed for this purpose, and I have illustrated by way of example a construction whereby this automatic actuation may be accomplished by means of fluid pressure, such, for example, as compressed air. This automatic operating mechanism is illustrated diagrammatically in Fig. 7, and is also partially illustrated in Fig. 1. It will be understood, however, that it is not intended to limit this invention to the particular automatic mechanism or arrangement shown in the drawings.

The automatic arrangement shown is actuated by means of a cam member 55, which is suitably secured on the main or eccentric shaft B of the shearing machine. During each rotation of the shaft B, the cam member 55 actuates the stems of two valves 56 and 57 which extend into the path of rotary movement of the cam, the valves being secured on a fixed part of the machine. Since these valves are of well known construction, they are not herein shown in detail, and it is sufficient to say that they serve to discharge compressed air contained in the valve housings when the stems of the valves are pressed inwardly by means of the cam 55. The valve 56 is connected by means of a pipe 59 leading to a manually operable valve 60, and then by means of another pipe 61 to one side of a clutch control valve having a housing 62. Consequently, when the plunger of the valve 56 is pressed inwardly, air or other fluid will be discharged out of the pipes 59 and 61 and out of the right hand end of the control valve housing 62. The other valve 57 is connected by means of a pipe or duct 64 to a stripper control valve having a housing 65, and consequently, when the stem of the valve 57 is pressed inwardly, air is discharged out of the pipe 64 and out of the right hand end of the stripper control valve housing 65.

The control valves in the housings 62 and 65 may be identical, and of any suitable or desired construction, those shown being of a well known type and of themselves do not constitute a part of this invention. Only one of these valves is illustrated in Fig. 6, namely, the valve 65, which contains a reciprocatory piston or plunger 70, which acts as a slide valve, and is movable endwise in the housing of the valve and held against rotation therein. Air or other fluid is admitted into the upper portion of the valve housing 65 by means of an inlet pipe connected with the fluid supply pipe 39. The housing is also provided with two ports, one of which is connected by means of the pipe 47 to the head end of the cylinder 44, and the other port is connected by means of the pipe 48 to the other end of the cylinder 44. As indicated by broken lines in Fig. 6, the slidable valve member 70 therein has passages extending through it which, when the slide valve 70 is located at the left as shown in Fig. 6, permit air to pass from the supply pipe 39 to the pipe 47 to the head of the cylinder 44 and air from the other end of the cylinder will be discharged through the pipe 48 to a discharge port 71 formed in the valve housing 65. When the slide valve member moves to the right in Fig. 6, air under pressure from the inlet pipe 39 will pass to the pipe 48 and the air from the head end of the cylinder 44 will be discharged through pipe 47 and through an air vent port 72 in the valve housing 65, the latter position being occupied by the slide valve when the wedge 28 is moved into its inoperative or stripper releasing position shown in Fig. 1.

The moving of the slide valve member 70 from one position to another is effected by discharging air from one end or other of the valve housing 65. For example, for moving the slide valve member 70 to the right in Fig. 6, to move the wedge 28 into position to engage the stripper with the work, air is discharged from the pipe 74 leading into the right side of the valve housing 65. This pipe 74 is connected through pipes 75 and 76 to a foot valve 77 of usual construction which may be depressed by the operator to permit air to be discharged from the pipes 76, 75 and 74 and from the right hand end of the valve housing 65. The reduction in air pressure at the right end of the valve housing, together with the admission of compressed air to the opposite side of the slide valve through a bleeder passage 78 extending through the slide valve 70 will cause the slide member 70 to move to the right. This bleeder passage is connected through small holes or passages with the compressed fluid passages in the slide valve 70. Another pipe 64 connects with the other end of the stripper control valve housing 65, and with the stripper release valve 57, so that when the cam 55 engages the stripper release valve, which occurs simultaneously with the beginning of the movement of the movable knife E toward the lower end of its stroke, the slide valve member 70 will be moved to the left into the position shown in Fig. 6 to admit air to the head end of the cylinder 44, and thus move the wedge into stripper releasing position. This occurs much more rapidly than the downward movement of the knife, so that the work will be held by the stripper before the movable knife engages the work.

The pipe 76 connecting with the foot valve 77 has a branch pipe 80 connecting with the left side of the other control valve 62, and consequently, by depressing the foot valve 77, the operator also causes the control valve 62 to actuate the clutch of the machine by means of a clutch cylinder 81, Fig. 7, which causes the operation of the shearing machine. This operation is continued until the cam 55 actuates the upper valve 56, so that air is discharged from the pipes 59 and 61 and from the right hand end of the clutch control valve 62. This causes the clutch to be disengaged, thus stopping the knife E at or near its upper position.

The hand controlled valve 60 serves the purpose of enabling the shearing machine to operate continuously or at the control of the operator through the medium of the foot valve 77. When the valve is in the position shown in Fig. 7, with the handle 82 thereof in the upright position, the machine is operated under the control of the operator through the foot valve 77, coming to a stop after each revolution of the shaft B. If the handle 82 is turned to the right, as indicated by the arrow, and into the dotted line position shown in Fig. 7, the machine will operate continuously. In that case, air will be cut off from the pipe 61 so that the clutch control valve 62 remains continuously in a position to keep the clutch in engaging position to operate the machine. The stripper mechanism will then be operated in such a manner that when the cam 55 actuates the valve 56, the stripper will be moved into clamping position for the reason that air will be exhausted from the pipe 59 and through the valve 60 from a pipe 84 connecting with the pipe 74 leading to the right hand end of the control valve housing 65. The releasing of the stripper mechanism will be actuated as heretofore described through the medium of the valve 57.

The construction of the stripper and its actuating wedge is comparatively simple and is very effective and reliable in operation. The angle of the inclined face of the wedge to the direction of movement of the wedge is made small enough so that ample power is provided for securely clamping the work while being cut and the angle can also be made small enough so that the wedge cannot be moved out of its operative position by upward pressure exerted on the stripper by the work.

The making of the stripper in two parts adjustable relatively to each other makes it possible to employ a small angled wedge, since by adjusting the lower part 10 of the stripper relatively to the work, a relatively small movement of the stripper is sufficient to effect the clamping of the work. The adjusting means for the stripper member makes the machine quickly and easily adaptable for operating on work of any thickness within the capacity of the machine, with a comparatively small movement of the stripper by the wedge. This small movement of the stripper enables the wedge to exert a powerful pressure of the stripper against the work, thus making the machine capable of holding the work very securely during the cutting operation, with the minimum of power acting on the wedge.

I claim as my invention:

1. In a shearing machine having a stationary knife and a movable knife, the combination of a stripping mechanism for confining the work in the desired relation to said stationary knife, and including a stripper member movable toward and from the work, a wedge which is movable transversely of the direction of movement of said stripper member and which, when moving in one direction, imparts movement to said stripper member in a direction to move said stripper member toward the work, and means for moving said stripper member away from the work when said wedge moves in the opposite direction.

2. In a shearing machine having a stationary knife and a movable knife, the combination of a stripping mechanism for holding the work in the desired relation to said lower knife, and including a stripper member movable toward and from the work, means for yieldingly urging said stripper member in a direction away from the work, and a wedge movable transversely of the direction of movement of said stripper member for imparting movement to said stripper member in a direction to move the same against said yielding means toward the work.

3. In a shearing machine having a stationary knife and a movable knife, the combination of a stripping mechanism for holding the work in the desired relation to said lower knife, and including a stripper member movable toward and from the work, and a wedge movable transversely of the direction of movement of said stripper member and having an upper face engaging a fixed part of said shearing machine and a lower face engaging said stripper member for moving the same toward the work, and means for moving said stripper member away from the work when said wedge member is moved in a direction to withdraw the lower face thereof from engagement with said stripper member.

4. In a shearing machine having a stationary knife and a movable knife, the combination of a stripping mechanism for confining the work in the desired relation to said stationary knife, and including a stripper member movable toward and from the work, a wedge movable transversely of the direction of movement of said stripper member and imparting movement thereto in a direction to move said stripper member into confining relation to the work, power operated means connected with said wedge for moving the same to position said stripper member into and out of its work confining position, and means for yieldingly urging said stripper member away from the work.

5. In a shearing machine having a stationary knife and a movable knife, the combination of a stripping mechanism for holding the work in the desired relation to said stationary knife, and including a stripper member movable toward and from the work, a wedge movable transversely of the direction of movement of said stripper member and imparting movement thereto in a direction to move said stripper member toward the work, a cylinder having a piston connected with said wedge, and means for supplying fluid under pressure to said cylinder at either side of said piston to move said wedge in either direction to move said stripper toward and from the work.

6. In a shearing machine having a stationary knife and a movable knife, the combination of a stripper for confining the work in the desired relation to said stationary knife and including two parts movable together toward and from the work, means for adjusting said parts toward and from each other to adapt the stripper for operation on work of different sizes, one of said parts being arranged to engage the work, a wedge movable transversely of the direction of movement of said stripper and engaging the other of said stripper parts for imparting movement to said stripper into holding engagement with the work.

7. In a shearing machine having a stationary knife and a movable knife, the combination of a stripper for holding the work in the desired relation to said stationary knife and including two parts movable toward and from the work, a wedge movably arranged to impart movement to one of the parts of said stripper in a direction to move said stripper toward the work, and a screw connecting said parts of said stripper for holding said stripper parts in different spaced relations to each other to enable the stripper to cooperate with work of different thicknesses.

8. In a shearing machine having a frame, and a stationary and a movable knife arranged on said frame, the combination of a stripping mechanism including an auxiliary frame having a part supporting said fixed knife, a movable stripper arranged in said auxiliary frame and movable toward and from the work, a wedge for moving said stripper into gripping engagement with the work, and a wedge guide part formed on said auxiliary frame, said wedge being movable with one face thereof engaging said wedge guide part and the other face thereof engaging said stripper.

9. In a shearing machine having a frame, and a stationary and a movable knife arranged on said frame, the combination of a stripping mechanism including an auxiliary frame having a part supporting said fixed knife, a movable stripper arranged in said auxiliary frame and movable toward and from the work, a wedge for moving said stripper into gripping engagement with the work, a wedge guide part formed on said auxiliary frame, said wedge being movable with one face thereof engaging said wedge guide part and the other face thereof engaging said stripper, said stripper being formed in two parts, one of which engages the work and the other of which engages said wedge, and means for adjusting said two parts relatively to each other to enable said stripper to cooperate with work of different thicknesses.

10. In a shearing machine having a stationary knife and a movable knife, the combination of a stripping mechanism for holding the work in the desired relation to said stationary knife, and including a stripper member movable toward and from the work, a wedge which is movable to actuate said stripper member for moving the same toward the work, a fluid operated cylinder arranged on the stationary part of said machine and having a piston connected with said stripper member, and means for admitting fluid under pressure to said cylinder to yieldingly urge said piston in a direction to move said stripper member out of engagement with the work.

11. In a shearing machine having a stationary knife and a movable knife, the combination of a stripping mechanism for holding the work in the desired relation to said stationary knife, and including a stripper member movable toward and from the work, a wedge operatively connected with said stripper member to move the same toward the work when said wedge is moved in one direction and for releasing pressure of the stripper against the work when the wedge is moved in the reverse direction, fluid pressure actuated means for imparting movement to said wedge in either direction, and cushioning means for stopping movement of said wedge toward the end of its movement to release said stripper.

12. In a shearing machine having a stationary knife and a movable knife, the combination of a stripping mechanism for holding the work in desired relation to said stationary knife, and including a stripper member movable toward and from the work, a wedge operatively connected with said stripper member to move the same toward the work when said wedge is moved in one direction and for releasing pressure of the stripper against the work when the wedge is moved in the reverse direction, fluid pressure actuated means for imparting movement to said wedge in either direction, a cushioning member carried by said wedge, a member arranged on a fixed part of said machine for engaging said cushioning means, and means for adjusting said last mentioned member relatively to said fixed part of said machine for stopping movement of said wedge.

STANLEY H. STONE.